United States Patent [19]
Daussan

[11] 3,760,865
[45] Sept. 25, 1973

[54] APPARATUS FOR THE FABRICATION OF MOLD LININGS SUCH AS HOT TOP SECTIONS FOR INGOT MOLDS

[76] Inventor: Henri Jean Daussan, rue du Fort, Longeville-les-Metz, France

[22] Filed: Aug. 11, 1971

[21] Appl. No.: 170,741

Related U.S. Application Data

[62] Division of Ser. No. 798,035, Feb. 10, 1969, Pat. No. 3,651,855.

[30] Foreign Application Priority Data
Feb. 23, 1968   France ............................ 68141036
Aug. 19, 1968   France ............................ 68159956

[52] U.S. Cl. .................... 164/160, 425/85, 222/373
[51] Int. Cl. .......................... B22c 15/22, B28b 1/26
[58] Field of Search .................. 164/7, 160; 425/85; 222/373

[56] References Cited
UNITED STATES PATENTS
1,785,097  12/1930  Raymond............................ 222/373
2,731,699  1/1956   Dubbs................................. 425/85
3,512,572  5/1970   Ednell................................. 164/7 X Primary Examiner—Robert D. Baldwin
Attorney—Irvin S. Thompson and Robert J. Patch

[57] ABSTRACT

An apparatus for the fabrication of mold linings such as hot tops and hot top sections for ingot-molds and similar lining elements, comprising means for conveying a slurry by difference of pressure into a closed mold having a cavity in which at least one wall is permeable to the dispersing phase of the slurry means for supplying continuously said slurry into said cavity until it is completely filled with the sediment formed by the material in suspension in the slurry and means for drying out the lining thus formed before it is removed from the mold. The mold comprises two superposable flask sections, each fitted with a half-shell which is at least partially permeable to the dispersing phase of the slurry and a chamber which can be fixed on one of the two flask sections and which is connected to a compressed air or vacuum source. The invention also includes an apparatus having the same object as the aforesaid one, and comprising a tank at atmospheric pressure containing a slurry, a closed mold made of two superposable flask sections as hereinbefore, two chambers which can respectively be fixed on said flask sections and one of which is connected to a compressed air or vacuum source, whereas the other chamber is fitted with a cock providing a communication with the atmosphere when open and a supply duct, one end of which is immersed in said tank.

1 Claim, 18 Drawing Figures

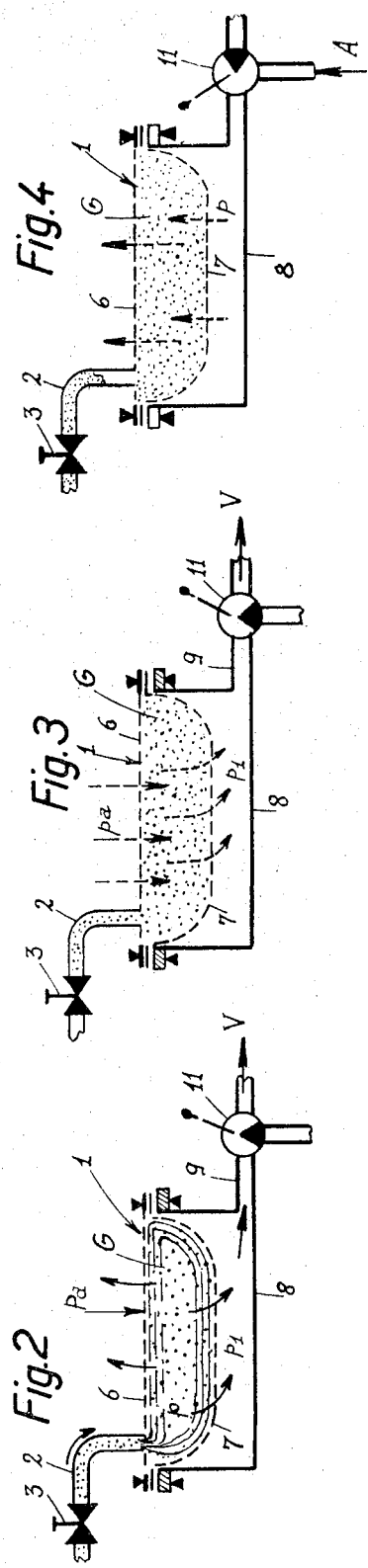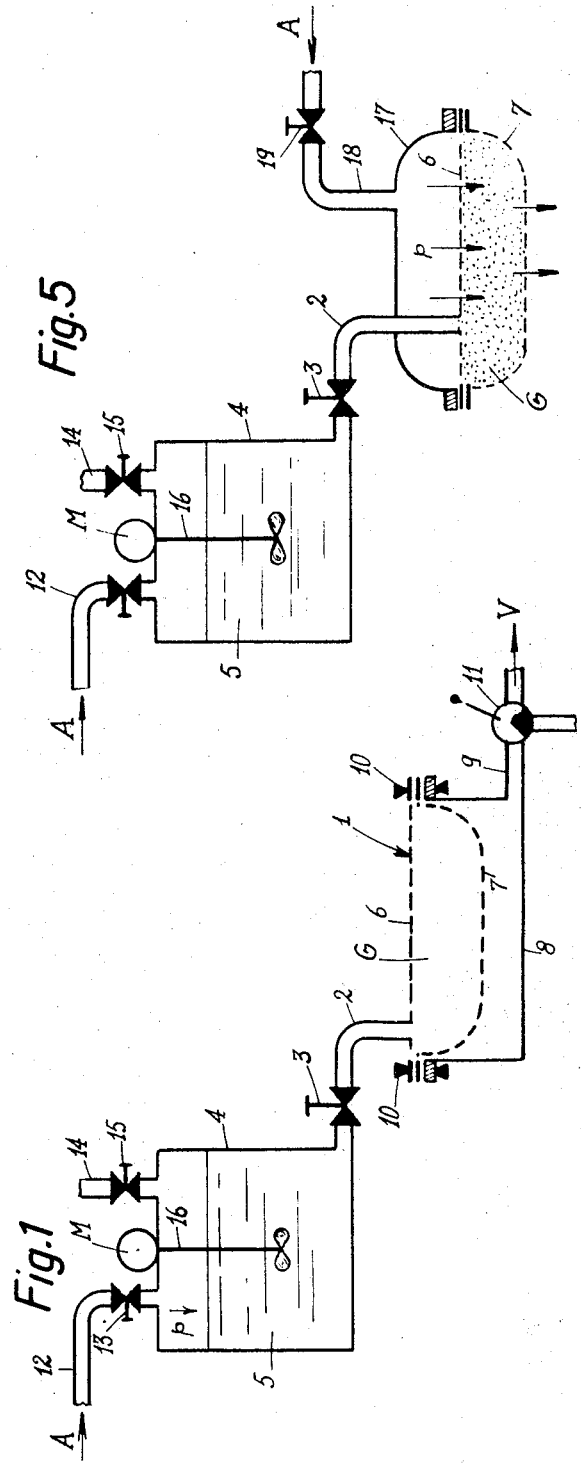

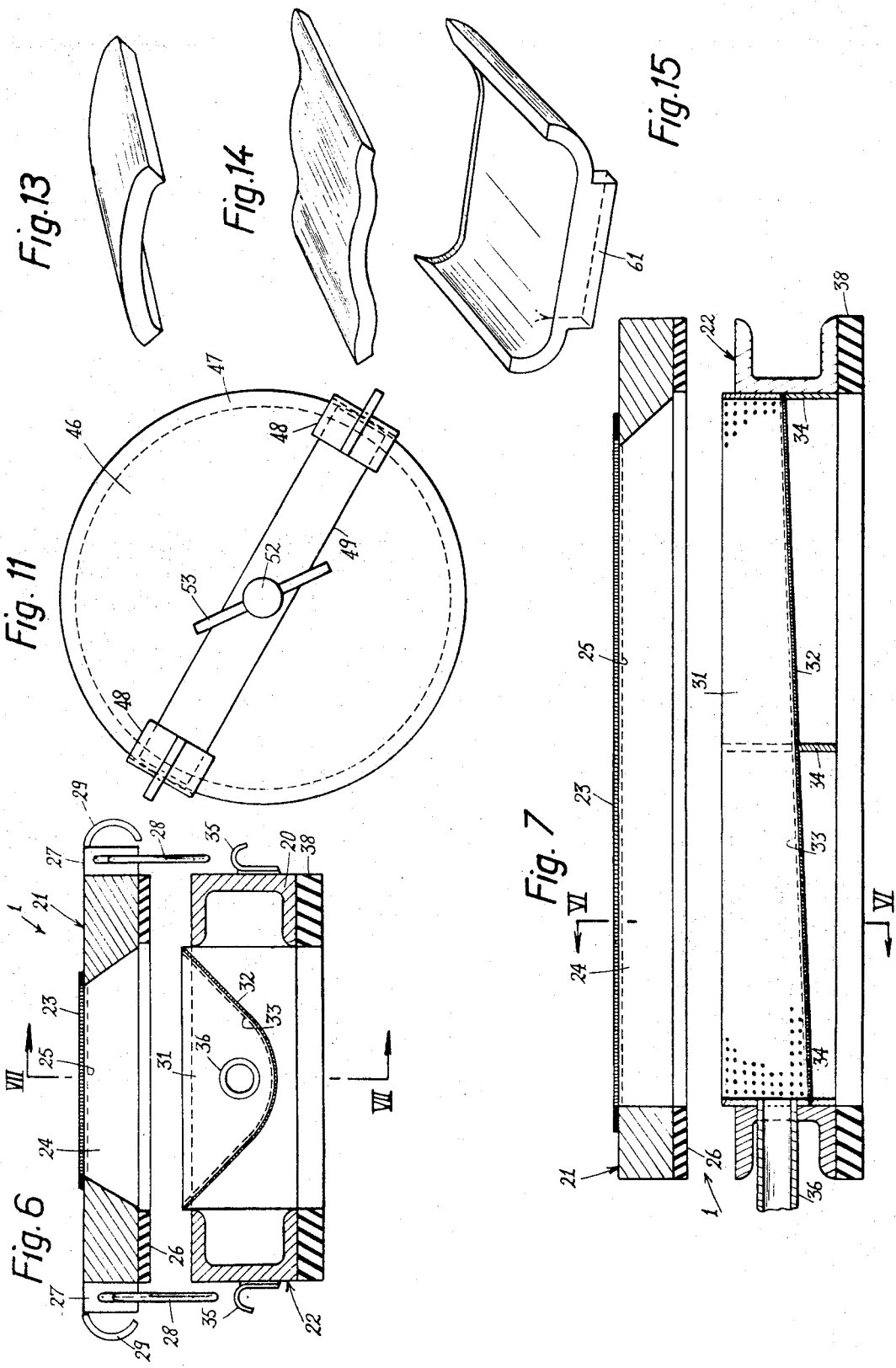

APPARATUS FOR THE FABRICATION OF MOLD LININGS SUCH AS HOT TOP SECTIONS FOR INGOT MOLDS

The present application is a divisional application of my copending application No. 798,035 filed on Feb. 10, 1969, now U.S. Pat. No. 3,651,855 issued Mar. 28, 1972.

The present invention relates to an apparatus for the fabrication of mold linings such as hot tops and hot tops sections for ingot-molds and similar lining elements employed in iron and steel manufacture.

It is known to retard the solidification of the top portion of an ingot in order that the metal which is still in the liquid state in this portion may be permitted to fill under the action of gravity the shrinkage cavities which have a tendency to form in the lower portions of the ingot as this latter solidifies. There is usually employed for this purpose an insulating and/or exothermic lining which is placed either inside the ingot-mold and at the top of this latter so as to cover the entire periphery of the wall or on top of the ingot-mold so as to extend the volume of this latter in the upward direction. The ingot-mold is filled with molten metal substantially up to the level of the top of the lining. During subsequent cooling of the ingot, the top portion of the molten metal which is located at the level of said lining remains in the liquid state after solidification of the subjacent portion and fills under the action of gravity the shrinkage cavities which form therein during the solidification process.

The linings which are adapted to correspond in shape to the internal volume of ingot-molds and all similar linings are obtained by molding in one piece or alternatively by assembly of preformed elements which are also obtained by molding from more or less complex starting compounds. These compounds are usually provided in the form of aqueous slurries which contain in suspension granular refractory materials in association with other products such as organic or mineral fibrous substances, an organic or mineral binder as well as exothermic materials.

It is known that special molding means must be employed in order that the linings should have suitable insulating properties as well as adequate cohesion.

When the linings are subjected at the time of use to the action of the heat of the molten metal, isothermal surfaces form inside said linings usually in a direction parallel to the wall which is in contact with the metal. It is found that the insulating capacity of the linings is improved when said isothermal surfaces are parallel to the layers of stratified solid materials which constitute the lining. It is therefore desirable to ensure that the stratification of the solid materials contained in the aqueous slurries takes place parallel to the walls of the lining.

It is also necessary to ensure that linings are accurately formed inasmuch as variations in thickness of the order of one millimeter are sufficient to produce a substantial variation in the insulating properties of said linings.

Accuracy of fabrication is particularly necessary when it is required to provide linings having a limited insulating capacity in the case, for example, in which it is found necessary to demold an ingot very rapidly after casting. There is a potential danger in such a case that the dead head has not always solidified to a sufficient extent.

Moreover, careful fabrication of linings is also necessary in order that the preformed elements can readily be assembled and subsequently that, at the time of removal of the ingot from the mold, those surfaces of the linings which are in contact with the metal will readily slide over this latter.

Using known means, linings are obtained by introducing a single measured quantity of aqueous slurry into a closed mold having one or a number of permeable walls, then by causing the sedimentation of the materials which are in suspension in the slurry by removing the aqueous phase from this latter through the permeable walls of the mold. This removal is carried out by applying a pressure to the free surface of the slurry which is admitted into the mold or else by applying an outward suction to at least a part of the permeable mold-walls.

All these means result in the production of linings which exhibit irregularities in thickness and lack of flatness on that surface which corresponds to the initial free surface of the slurry.

The above-noted disadvantages arise from the need to proportion either by volume or by weight the quantities of slurry which are introduced into the mold in a single operation. Any error in the quantity or any variation in the concentration of the slurry produces variations in the thickness of linings which are molded in this manner. Linings which are of insufficient thickness are discarded whilst those which are of excessive thickness have to be trimmed. In all cases, production is irregular and entails high capital expenditure.

Moreover, the presence of a free surface of slurry within the interior of the mold results in the fact that the stratification of materials in suspension preferably takes place parallel to said surface. Using known means, the flat linings are necessarily fabricated horizontally in order that they should have good insulating properties. The presence of this plane of preferential stratification also makes it impossible to achieve satisfactory production of linings which have complicated shapes. These limitations also impose a heavy penalty.

The aim of the present invention is to overcome the disadvantages mentioned in the foregoing.

In accordance with the invention, the apparatus for the fabrication of mold linings such as hot tops and hot top sections for ingot-mold and similar lining elements in the form of molded objects which are subsequently hardened by drying comprises means for conveying a slurry by difference of pressure into a closed mold having a cavity in which at least one wall is permeable to the dispersing phase of the slurry and in which the volume of said cavity is similar to that of the lining to be reproduced, means for supplying continuously said slurry so as to maintain the maximum level within said cavity until it is completely filled with the sediment formed by the material in suspension in the slurry and means for drying out the lining thus formed before it is removed from the mold.

Preferably, the surface of the walls of the mold cavity is permeable over the greater part thereof. Since the pressure inside the cavity outreaches the pressure outside its permeable walls, the dispersing phase of the slurry is progressively removed through said permeable walls while the materials in suspension in the slurry are deposited on said walls at the same time. Since the cavity is continuously full as a result of a continuous supply of slurry, the deposition of the materials in suspension also takes place on all the permeable walls and in parallel relation thereto.

When the permeable walls are subjected to a suction from outside throughout the period of filling of the cavity, said suction is advantageously maintained after filling of the mold in order to activate drying of the lining which is formed within the mold cavity.

In another embodiment, drying is also carried out by forcing compressed air into the lining to be dried.

After drying, linings can advantageously be employed in the as-manufactured state without any subsequent machining; said linings have a good insulating capacity by reason of their stratified structure parallel to the faces. The shape of said linings can be as desired.

The mold advantageously comprises two superposable flask sections each fitted with a permeable half-shell and a chamber which can be fixed on the large free face of one of the two flask sections and which is connected to a compressed air or vacuum source.

According to a particular embodiment of the system for supplying slurry, said system comprises a pressure vessel which is hermetically sealed by means of a detachable cover and contains slurry under a compressed-air pressure, said pressure vessel being connected to an inspection chamber which is in turn connected to the mold by means of a supply pipe.

In a preferred form of construction, the device essentially comprises a second chamber disposed on the side opposite to the first chamber relatively to the mold, said second chamber being fitted with a cock providing, when open, a communication with the atmosphere and the mold being connected to a supply duct having an end immersed in a tank which is at atmospheric pressure.

The creation of a partial vacuum within the mold has the effect both of filling this latter and of applying against each other the edges of the two permeable half-shells constituting said mold and the two chambers which are adjacent thereto. The presence of clamping devices for the purpose of joining the two half-shells together thus serves no furhter purpose. This simplifies the structural design of the mold as well as the handling operations involved.

Further particular features of the invention will become apparent from the description which now follows, reference being made to the accompanying drawings which are given by way of example and not in any sense by way of limitation, and in which:

FIG. 1 is a highly simplified diagram of a first device in accordance with the invention;

FIGS. 2 to 4 are partial diagrams which are similar to FIG. 1 and illustrate different stages of achievement of the linings;

FIG. 5 is a highly simplified diagram of a variant of FIG. 1;

FIGS. 6, 7, 8 illustrate an industrial design of a mold according to the invention;

FIG. 6 is a transverse sectional view taken along line VI—VI of FIG. 7 and showing the mold in the open state;

FIG. 7 is the corresponding longitudinal sectional view taken along line VII—VII of FIG. 6;

FIG. 8 is a trasverse sectional view of the mold in the closed state;

FIGS. 9 to 12 are views on a smaller scale showing an industrial design of the system adopted for supplying said mold;

FIG. 9 is a view in elevation;

FIG. 10 is a horizontal sectional view taken along line X—X of FIG. 9;

FIG. 11 is a plan view of a device for the hermetic closure of the system;

FIG. 12 is a partial vertical sectional view of said system;

FIGS. 13, 14 and 15 show in perspective different forms of construction of linings;

Figure 8:
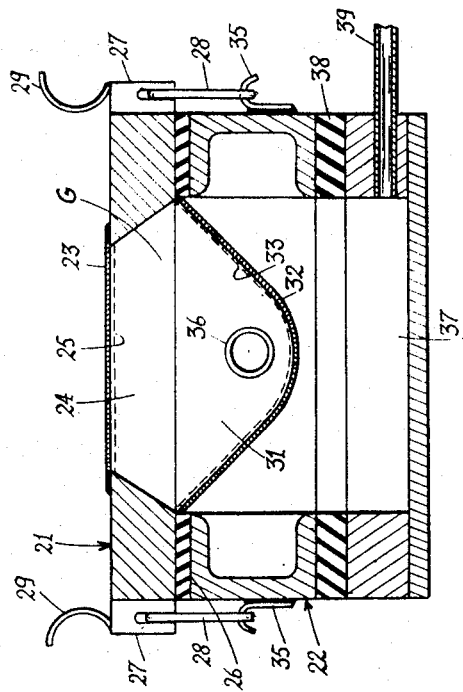

Referring now to FIGS. 1 to 3 of the accompanying drawings, the device which is shown diagrammatically therein comprises a closed mold 1 which is connected by means of a duct 2 fitted with a shut-off valve to a reservoir-tank 4 containing the slurry 5 which is intended to form the lining. The duct 2 is preferably transparent for a reason which will be explained hereinafter.

The mold 1 is formed by coupling two half-shells 6 and 7 having walls which are permeable to the dispersing phase of the slurry 5. The upper half-shell 6 communicates with the duct 2 for the admission of slurry 5 whilst the other half-shell 7 is enclosed within a suction chamber 8, said chamber being connected to a vacuum apparatus V (not shown in the figure) by means of a pipe 9 fitted with a three-way valve 11. Clamping members which are shown diagrammatically at 10 are provided for the purpose of providing a leak-tight joint between the components 6, 7 end 8. Said clamping members may, for example, be either vises, press jaws or jacks.

The walls of the two half-shells 6 and 7 which are thus clamped together form an internal cavity G having a volume which is similar to that of the lining or lining element to be reproduced. A wide range of different shapes of lining elements may be contemplated such as those which are shown by way of example in FIGS. 13, 14 and 15.

The hermetically sealed tank 4 which receives the slurry 5 is provided at the top with a pipe 12 fitted with a shut-off valve 13. Compressed air supplied from a source A (not shown in the figure) can be conveyed through said pipe. The tank 4 is also provided with a nozzle 14 and shut-off valve 15 for connecting to free air and a motor M for actuating an internal agitator 16. Said agitator serves to prevent settling of materials which are in suspension in the slurry 5.

When the apparatus shown in FIGS. 1 to 3 is to be used, the valve 15 of the nozzle 14 which connects the tank 4 to free air is at first closed whilst the valve 13 for the admission of compressed air into the tank 4 is open; the shut-off valve 3 of the duct 2 is then opened, thereby supplying the slurry 5 which accordingly fills the empty cavity G formed between the two half-shells 6 and 7 of the mold 1 (as shown FIG. 2). By rotating the three-way valve 11 in the appropriate direction, the suction chamber 8 is then put into communication with a vacuum apparatus V (not shown in the figures) such as a water-jet pump or vacuum pump.

In consequence, the water contained within the slurry 5 escapes through all the permeable walls of the cavity G and more particularly through the wall of the half-shell 7. At the same time, the materials in suspension are deposited on said walls in uniform layers as shown diagrammatically in FIG. 2. Since the supply of slurry 5 continues regularly within the cavity G which is thus maintained full, the deposits of solid phase increase in thickness in a progressive and uniform manner towards the central portion of the cavity G which is finally filled with the material thus deposited. Filling of the cavity G is completed when the slurry no longer flows within the duct 2 which connects the mold 1 to the tank 4. The shut-off valve 3 is then closed. The transparent duct 2 enables the operator to ascertain whether the slurry is flowing or not. Other known means (such as flow indicators) can be provided for this purpose.

At this stage, a suction continues to be applied to the lower half-shell 7 for the purpose of drying-out the deposit formed within the cavity G, as shown in FIG. 3. This suction-drying stage is continued for a sufficient period of time. The lining element which has just been formed in this manner is then demolded by separating the two half-shells 6 and 7. Said lining element is readily separated from the small-section core which is formed within the slurry supply duct 2. The lining element is then advantageously subjected to a natural or accelerated drying process.

In an alternative construction shown in FIG. 4, drying-out is performed by circulating compressed air in the upward direction inside the lining element which is formed within the cavity G. To this end, the section chamber 8 is temporarily transformed into a compressed-air delivery chamber by rotating the three-way valve 11, of the outlet pipe 9 in the appropriate direction to connect the compressed air source A to the chamber 8.

The compressed air which is delivered within the chamber 8 passes through the lining G and thus dries-out this latter. At the same time, the compressed air exerts a thrust on the core which is formed within the duct 2 near the outlet of this latter in the cavity G and separates said core from the mass contained in the mold 1. Demolding of the lining element which is formed is thus facilitated to a remarkable extent and the same applied to initial filling of the cavity G at the beginning of the following molding operation.

In another alternative construction which is shown in FIG. 5, the suction chamber 8 of the mold 1 is replaced by a delivery chamber 17 which is placed above the mold 1 and communicates with the compressed air source A via a pipe 18 which is fitted with a shut-off valve 19.

In this alternative form, during the stage of filling of the cavity G, settling of the solid materials contained in the slurry and expulsion of the water take place under the action of the pressure difference which exists between the pressure prevailing within the cavity G and atmospheric pressure; during the drying-out stage, the valve 19 of the pipe 18 which connects the source A to the delivery chamber 17 is opened and the compressed air which is introduced into said chamber passes downwards through the molded element G and dries out this latter whilst the valve 3 is closed.

It is readily apparent that the system adopted for supplying the mold 1 with slurry 5 can be other than that described. Thus, the pressure of injection of the slurry 5 can be obtained, for example, simply as a result of a difference in hydrostatic pressure. In this case, the tank 4 is advantageously placed at a distance of approximately one meter above the mold 1. The injection pressure can also be obtained by employing a circulating pump which is placed in the duct 2 in order to draw the slurry from the bank 4 and discharge it into the mold, the tank 4 being accordingly connected to free air. A branch pipe which is connected between the discharge end of the pump and the tank and which is controlled by a valve serves to return the stream of slurry to the tank between two successive molding stages. This continuous circulation serves to prevent settling of the slurry.

One industrial application of the invention will now be described in detail with reference to FIGS. 6 to 12 which relate more especailly to a mold and its system of supply of slurry under pressure.

Refering now to FIGS. 6 to 8, it is apparent that the mold 1 comprises two flask sections 21 and 22 which are intended to be placed in superposed relation and rigidly coupled together by means of a lateral locking system.

The upper flask section 21, which is formed of metal and is of rectangular shape, is provided with an opening which is closed on one side by a perforated plate 23 and constitutes the upper half-shell 24 of the mold 1. A fine-mesh wire gauze 25 which is permeable only to water is applied against the internal wall of the perforated plate 23. The mesh size of the wire gauze 25 is adapted to the particle size of the solid phase of the slurry. The flask section 21 is fitted on the underface with a peripheral seal 26 formed, for example, of polyurethane foam whilst clamping and locking members 27 are fixed on the side of said flask section and comprise rings 28, the positions of which are controlled by means of articulated fingers 29.

The lower flask section 22 has the same shape as the upper flask section but is of different thickness and comprises a sectional frmae 20 having a U-shaped cross-section. The lower half-shell 31 has the shape of a frusto-conical trough in the example herein described and is placed in the opening of said frame 20. The wall 32 of the half-shell 31 is constituted by a perforated plate which is lined internally with a wire gauze 33 having a fine mesh which is permeable only to water. The removable half-shell 31 which projects above the top surface of the flask section 22 is supported by brackets 34 placed at the ends and at the center of said half-shell.

The lower flask section 22 is provided on the longitudinal faces thereof with lugs 35 in which the locking rings 28 of the flask section 21 are adapted to engage and is provided on a transverse face with a nozzle 36 which opens into the lower half-shel 31.

The lower flask section 22 can be secured to the edge of a chamber 37 as shown in FIG. 8, with interposition of a seal 38 of substantial thickness and formed of polyurethane foam. The chamber 37 communicates freely with the half-shell 31 and is fitted with a pipe 39 for suction or delivery of air.

The volume G which is formed within the walls of the two half-shells 24 and 31 when these latter are superposed is similar to the volume of the lining element to be reproduced.

The slurry supply system comprises (as shown in FIGS. 9 to 12) a metallic vessel 41 which is strengthened in the cylindrical portion thereof by a frame consisting of two circular sectional bands 42, 43 which are braced by upright members 44. The band 42 rests on three legs 45 which are anchored in the floor whilst the band 43 forms an annular flange around the opening of the vessel 41.

The vessel is closed by a removable cover 46 with interposition of a peripheral seal 47 which is fixed to the cover 46 and intended to rest on the edge of the band 43. The cover 46 is subjected to the clamping action of a device which comprises two right-angled lugs 48 in diametrically opposite relation and carried by the band 43. Said clamping device further comprises a removable cross-member 49 which is fitted with a central nut 51 in which is mounted a threaded rod 52 controlled by an operating handle 53.

The bottom portion 41a of the vessel 41 is of frusto-conical shape and carries a chamber 54 of elongated shape, one end of said chamber being closed by an inspection door 55 whilse the other end is connected to the pipe 36 which extends to the mold 1.

Figure 12:
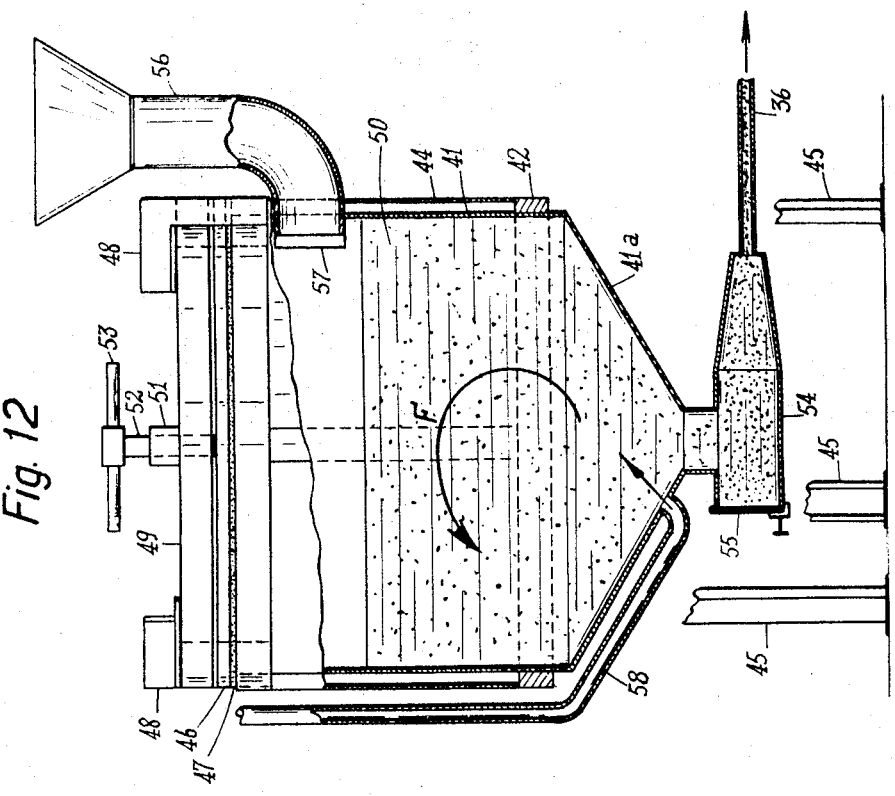
Figure 9:
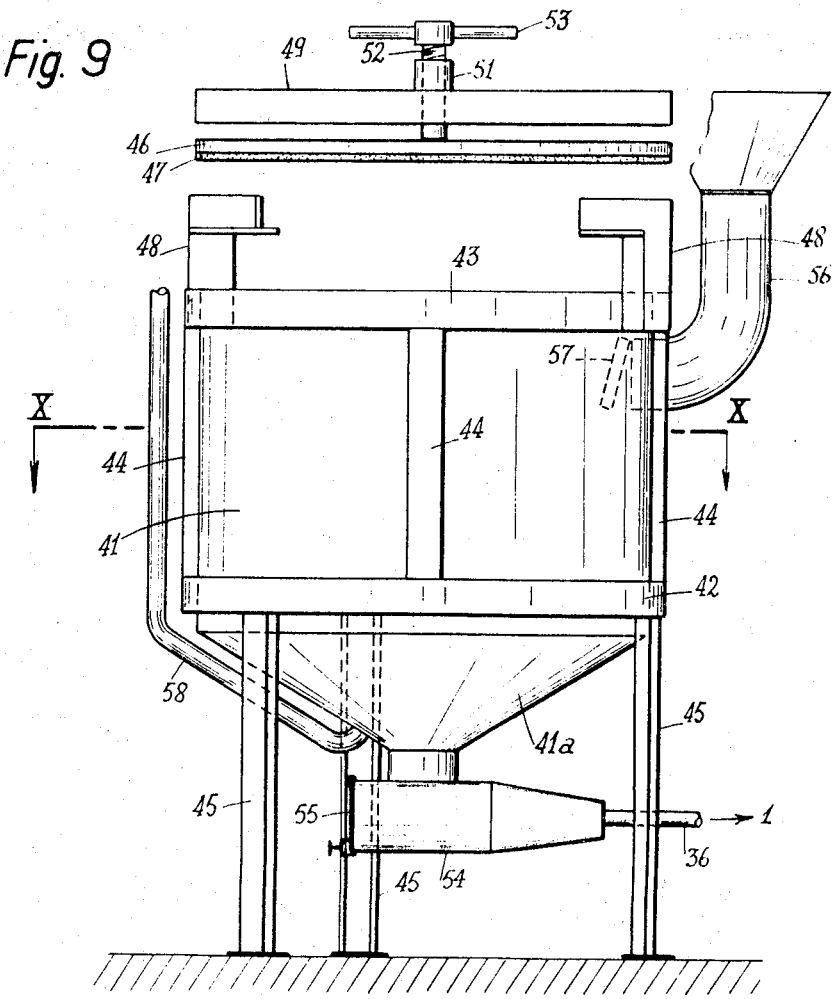
Figure 10:
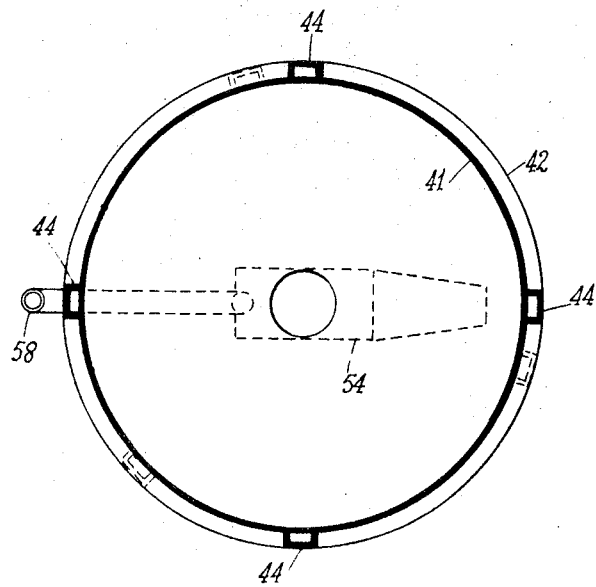

The system for supplying slurry to the vessel 41 comprises a pipe 56 which is attached to the top of the vessel 41 and fitted with a check valve 57 of the hermetic closure type which is fitted in the outlet of said pipe. Another pipe 58 for the supply of compressed air terminates at the frusto-conical portion 41a of the vessel 41. As shown in FIG. 12, the air-supply pipe 58 is so arranged that the jet of compressed air is directed into the tank at an oblique angle, thereby producing a degree of turbulence within the slurry 50 as the air flows upwards within this latter in the direction of the arrow F in order to prevent setting of the slurry.

In order to fabricate a lining element by means of the industrial device hereinabove described, the upper flask section 21 of the mold is placed over the lower flask section 22 as shown in FIG. 8. Said flask sections are assembled by lifting the locking levers 29, thereby causing the rings 28 of the upper flask section 21 to engage over the lugs 35. The locking system is designed to ensure that the flask sections 21, 22 are tightly clamped together and compress the seal 26. The chamber 37 is put into communication with a vacuum apparatus. The vessel 41 is closed by the cover 46 which is applied against the band 43 by the screw 52, the cross-member 49 having previously been engaged between the lugs 48. The vessel 41 is filled with slurry 50 by way of the pipe 56 and is then put under pressure by injecting compressed air through the pipe 58 (shown in FIG. 12). The lining element is then molded as was described earlier with reference to FIGS. 1 to 3.

After drying-out, the flask sections 21 and 22 are released. The upper flask section 21 is removed, the core which is formed within the pipe 36 for supplying slurry 50 is detached from the lining element which has just been formed and said element is removed from the mold by reversing the lower flask section 22.

The lining elements which are successively obtained in subsequent cycles of operation are always identical, are of uniform thickness and have constant properties.

As will be readily apparent, the vessel 41 is recharged with slurry between two successive molding operations whenever the need arises. In the event of unexpected clogging at the base of the vessel 41, the chamber 54 which is placed beneath said tank is opened by operating the door 55 and then cleaned.

The industrial device described in the foregoing also permits molding of lining elements by application of the alternative form of construction which was described with reference to FIG. 4. In such a case, the chamber 37 which is placed beneath the lower flask section 22 receives compressed air at the time of execution of the drying-out operation and the vessel 41 of the supply system is connected to free air by releasing the cover 46 after stopping the admission of compressed air.

The invention advantageously permits the fabrication of all forms of lining elements, even elements having complicated shapes. For example, it is possible to form lining elements having curved edges as shown in FIGS. 13, wavy surfaces as shown in FIG. 14 or shouldered projections as shown by way of example at 61 in FIG. 15. In these different cases, the lining elements obtained always possess good insulating properties. In fact, irrespective of their shape, the successive layers of substances deposited in the mold are practically always parallel to the walls, with the result that the stratified structures thereby obtained conform closely to the shape of said lining elements.

The invention also permits of controlled variation in the density and consequently in the porosity of lining elements by modification of the pressure of injection of slurry into the mold.

It is readily apparent that the foregoing construction of the device according to the invention can admit of alternative forms without thereby departing from the scope of the invention. In particular, the two flask sections 21 and 22 can be interlocked by means of jacks. Similarly, the chamber 37 could be fixed on the upper flask section 21.

Should it be desired in addition to maintain permanent agitation within the vessel 41 by blowing compressed air means of the pipe 58, it is possible to provide the cover 46 with a discharge pipe fitted with a valve for regulating leakage flow.

Finally, it is evident that the valves such as 3, 11, 13 and 14 of FIG. 1 can be of the pneumatic or electro-magnetic automatic-control type, for example, in which case a program unit with incorporated time base is provided for the automatic performance of cycles.

Figure 16:
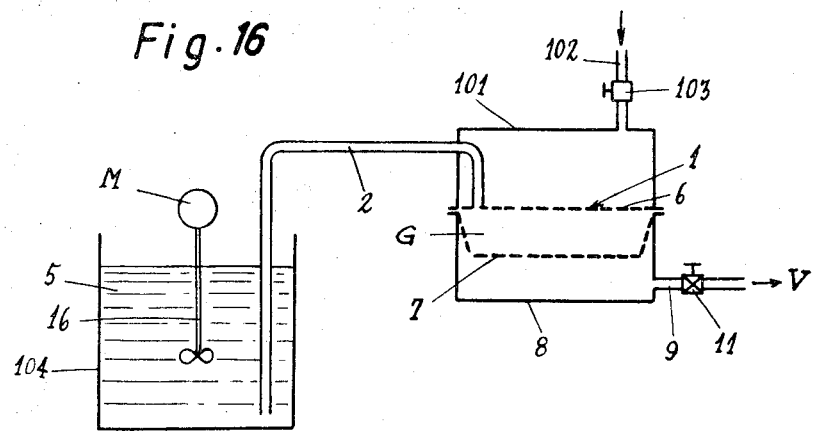
FIG. 16 is a highly simplified diagram of a second device in accordance with the invention.
Figure 17:
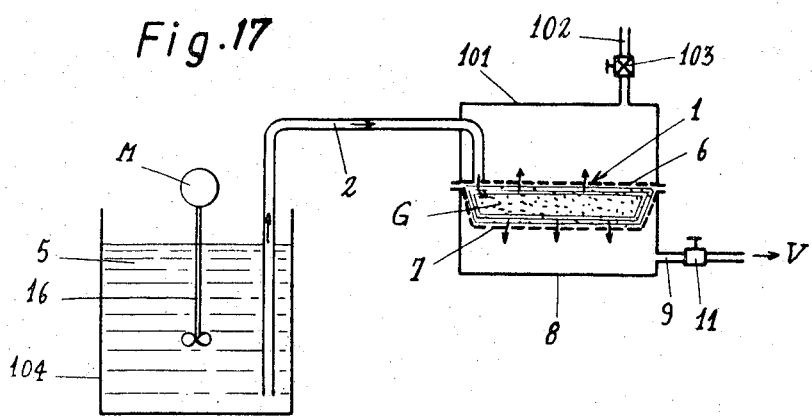
FIG. 17 is a similar diagram showing the filling of the mold.
Figure 18:
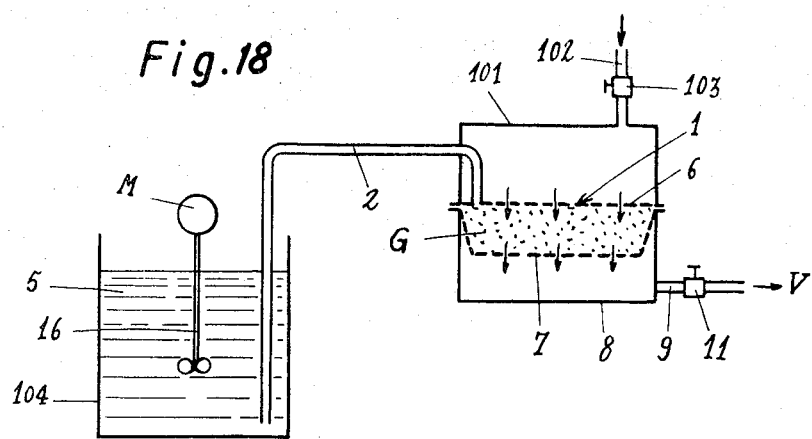
FIG. 18 is a similar diagram showing the drying of the lining formed during the preceding operation.

In the preferred construction of FIGS. 16 to 18, the device comprises a second chamber 101 placed on the side opposite to the chamber 8 relative to the mold 1 and is provided with a pipe 102 for establishing a communication with the atmosphere, said pipe being fitted with a cock 103. The slurry supply duct 2 which is connected at one end to the upper half-shell 6 extends at the other end thereof into a tank 104 which contains the slurry 5. Said tank 104 communicates with the atmosphere at the top and contains an agitator 16 which is actuated by a motor M.

In order to fabricate a lining element, the tank 104 is filled with the slurry 5 and the agitator 16 is put into operation by means of the motor M; the chamber 101 is placed over the upper half-shell 6 and the cock 103 is closed.

The pipe 9 is then put into communication with the vacuum apparatus V (which has not been shown in the figures) and the valve 11 is opened. The slurry 5 is then sucked into the mold 1 through the duct 2 and fills the cavity G formed between the two half-shells 6 and 7, the edges of which are applied against each other. The water contained in the slurry 5 escapes through the permeable walls of the mold 1; at the same time, the materials in suspension are deposited on said walls in uniform layers as shown diagrammatically in FIG. 17.

A progressively greater pressure drop is produced as the quantity of solid substances contained in the cavity G increase: the rate of flow of the slurry 5 within the duct 2 decreases and finally falls to zero when the degree of compactness of the solid material within the cavity G has attained a given value which is governed by the degree of vacuum initially produced by the vacuum apparatus V.

When it is observed that the level of slurry within the tank 104 drops at only a very slow rate, the cock 103 is opened and the chamber 101 is consequently put into communication with the atmosphere whilse the valve 11 is left open. An air stream which passes from the pipe 102 towards the pipe 9 then flows through the mold 1 as shown diagrammatically in FIG. 18 and carries with it a part of the water which is still present in the solid material contained within the cavity G; the slurry continues to be tranferred through the duct 2 at a low rate of flow for a limited period of time.

When the drying action of the air stream is completed, the valve 11 is closed, the chamber 101 which is applied against the edges of the mold 1 only under the action of its own weight is then removed and the lining element which is formed by the deposition of solid substances within the cavity G is finally demolded.

What I claim is:

1. Apparatus for making molded objects, comprising a tank for receiving a slurry, a mold having at least two opposite walls which are at least partially permeable to the dispersing phase of said slurry, communication means between said tank and said mold, slurry injection means comprising means for creating a differential pressure between the interior of said mold and the atmosphere and comprising a chamber adjacent to a permeable wall portion of the mold, means for connecting said chamber to a vacuum source, means for maintaining the permeable portion of the opposite mold wall at a pressure which does not exceed atmospheric pressure, the tank for slurry being at atmospheric pressure, and drying means comprising means for applying a differential pressure between the outside faces of the said opposite walls and comprising a second chamber adjacent to the permeable wall portion opposite to that adjacent to the first chamber, said second chamber having a valve that establishes communication with the atmosphere when open, thereby providing a drying airstream through the molded object.

* * * * *

UNITED STATES PATENT OFFICE
CERTIFICATE OF CORRECTION

Patent No. 3,760,865      Dated September 25, 1973

Inventor(s) Henri Jean Daussan

It is certified that error appears in the above-identified patent and that said Letters Patent are hereby corrected as shown below:

On the cover sheet, in the heading, item [30]

"68141036" and "68159956" should read -- 68.141036 -- and -- 68.159956 --.

Signed and sealed this 25th day of June 1974.

(SEAL)
Attest:

EDWARD M. FLETCHER, JR.       C. MARSHALL DANN
Attesting Officer      Commissioner of Patents